United States Patent
Lang et al.

(10) Patent No.: US 10,686,685 B2
(45) Date of Patent: *Jun. 16, 2020

(54) SUSPENDING AND RESUMING VIRTUAL MACHINES IN A NETWORK

(71) Applicant: International Business Machines Corporation, Armonk, NY (US)

(72) Inventors: Jakob C. Lang, Tuebingen (DE); Angel Nunez-Mencias, Stuttgart (DE); Thomas Pohl, Weil im Schoenbuch (DE); Martin Troester, Rennigen (DE)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/295,808

(22) Filed: Mar. 7, 2019

(65) Prior Publication Data

US 2019/0207838 A1    Jul. 4, 2019

Related U.S. Application Data

(63) Continuation of application No. 15/203,990, filed on Jul. 7, 2016, now Pat. No. 10,263,870.

(51) Int. Cl.
*H04L 12/26* (2006.01)
*G06F 9/455* (2018.01)
(Continued)

(52) U.S. Cl.
CPC ...... *H04L 43/0876* (2013.01); *G06F 9/45558* (2013.01); *H04L 41/0896* (2013.01);
(Continued)

(58) Field of Classification Search
CPC ............. H04L 43/0876; H04L 41/0896; H04L 69/324; H04L 61/2076; H04L 67/1027;
(Continued)

(56) References Cited

U.S. PATENT DOCUMENTS 7,558,845 B2    7/2009  Finley, Jr.
8,185,893 B2    5/2012  Hyser et al.
(Continued)

OTHER PUBLICATIONS

"Netwirx Virtual Machine Sprawl Tracker", http://www.netwrix.com/virtual_machine_sprawl_tracker_freeware.html, download Feb. 19, 2016 (2 pages).
(Continued)

*Primary Examiner* — Brian J. Gillis
*Assistant Examiner* — Chhian (Amy) Ling
(74) *Attorney, Agent, or Firm* — Heslin Rothenberg Farley & Mesiti P.C.; William A. Kinnaman, Esq.

(57) ABSTRACT

A method is provided for suspending and resuming virtual machines in a network in dependence of network activity. The method includes providing a virtual machine manager. The virtual machine manager monitors network traffic of the virtual machines on a network bridge in a network layer using data packet analysis to detect dedicated network protocol traffic. More particularly, the monitoring of network traffic of the virtual machines may include: logging network addresses of the virtual machines of the network; combining logged network addresses with information about suspending or resuming virtual machines based on filtering rules being provided for such combination; and sending information about the network addresses of active and suspended virtual machines for virtual network adapters assigned to the virtual machines to the virtual machine manager.

20 Claims, 6 Drawing Sheets

(51) Int. Cl.
    *H04L 12/24* (2006.01)
    *H04L 29/08* (2006.01)
    *H04L 29/12* (2006.01)
(52) U.S. Cl.
    CPC ........ *H04L 67/1027* (2013.01); *H04L 69/324* (2013.01); *G06F 2009/45575* (2013.01); *G06F 2009/45595* (2013.01); *H04L 61/2076* (2013.01)
(58) Field of Classification Search
    CPC . G06F 2009/45575; G06F 2009/45595; G06F 9/45558
    See application file for complete search history.

(56) References Cited

U.S. PATENT DOCUMENTS

| | | |
|---|---|---|
| 8,635,395 B2 | 1/2014 | Colbert |
| 8,880,687 B1 | 11/2014 | Chandrachari et al. |
| 8,924,534 B2 | 12/2014 | Suri et al. |
| 9,104,469 B2 | 8/2015 | Bajaj et al. |
| 9,971,616 B2 | 5/2018 | Kaul |
| 2006/0218252 A1 | 9/2006 | Ford et al. |
| 2010/0205304 A1 | 8/2010 | Chaturvedi et al. |
| 2012/0047503 A1 | 2/2012 | Lu et al. |
| 2012/0151272 A1 | 6/2012 | Behrendt et al. |
| 2014/0173213 A1 | 6/2014 | Beveridge |
| 2015/0154046 A1 | 6/2015 | Farkas et al. |
| 2015/0227382 A1 | 8/2015 | Botzer |
| 2016/0055021 A1 | 2/2016 | Beveridge |
| 2016/0062780 A1* | 3/2016 | Young ................. G06F 9/45558 718/1 |
| 2017/0083354 A1 | 3/2017 | Thomas et al. |
| 2018/0013651 A1 | 1/2018 | Lang et al. |

OTHER PUBLICATIONS

Franzini, "Idle Virtual Machine Detection in FermiCLoud", Fermilab Scientific Computing Division: Grid and Cloud Computing Department, Sep. 21, 2012 (18 pages).

Frenzel, "What's the Difference Between The OSI Seven-Layer Network Model and TCP/IP?", Oct. 2, 2013, Electronic Design, pp. 1-9.

List of IBM Patents or Patent Applications Treated as Related, Mar. 15, 2019, 2 pages.

* cited by examiner

SUSPENDING AND RESUMING VIRTUAL MACHINES IN A NETWORK

BACKGROUND

Virtualization may enable multiple operating systems to run on one physical host computer. The number of virtual machines (VMs) per physical host computer has seen an increase in recent times with the advent of powerful hardware. As hardware becomes even more powerful, higher consolidation ratios of VMs on a host computer may be expected. As higher workloads are being consolidated in a host computer, the advantage a customer/user has may directly be proportional to the workloads and/or the number of applications involved.

In a development and simulation cloud, resource bottlenecks may exist due to VMs running in idle state. While resource limitations have been lifted by technology advances, such as over-commitment of resources like memory, disk and processor cores, certain virtualized applications, such as simulation environments, may still occupy resources when not used for productive work. However, users tend to not suspend their VMs due to various reasons. One is the fact that VMs are managed via a Web GUI, but the interaction with the virtual machines instances occurs mostly via Secure Shell (SSH) or Virtual Network Computing (VNC).

Therefore, in virtualized computer systems it may be desirable in certain circumstances to suspend a virtual machine and resume it at a later time. In order to save resources, for instance, computing power, energy or memory, it may also be advantageous to suspend a virtual machine and resume it at a later time.

SUMMARY

In one or more embodiments, a method is provided for suspending and resuming virtual machines in a network in dependence of network activity. The method includes: providing a virtual machine manager, the virtual machine manager monitoring network traffic of the virtual machines on a network bridge and a network layer using data packet analysis to detect dedicated network protocol traffic.

In one or more further aspects, a computer program product is provided for suspending and resuming virtual machines in a network in dependence of network activity. The computer program product includes a computer readable storage medium having program instructions embodied therewith, the program instructions being executable by a computer to cause the computer to perform a method including: monitoring, via a virtual machine manager, network traffic of the virtual machines on a network bridge in a network layer using data packet analysis to detect dedicated network protocol traffic.

In one or more further aspects, a system for suspending and resuming virtual machines in a network in dependence of network activity is provided. The system includes a memory, and a processor communicatively coupled to the memory, wherein the system performs a method including: monitoring, via a virtual machine manager, network traffic of the virtual machines on a network bridge in a network layer using a data packet analysis to detect dedicated network protocol traffic.

Additional features and advantages are realized through the techniques of the present invention. Other embodiments and aspects of the invention are described in detail herein and are considered a part of the claimed invention.

BRIEF DESCRIPTION OF THE DRAWINGS

The present invention together with the above-mentioned and other objects and advantages may best be understood from the following detailed description of certain embodiments, but not restricted to the discussed embodiments, wherein.

DETAILED DESCRIPTION

Figure 1:
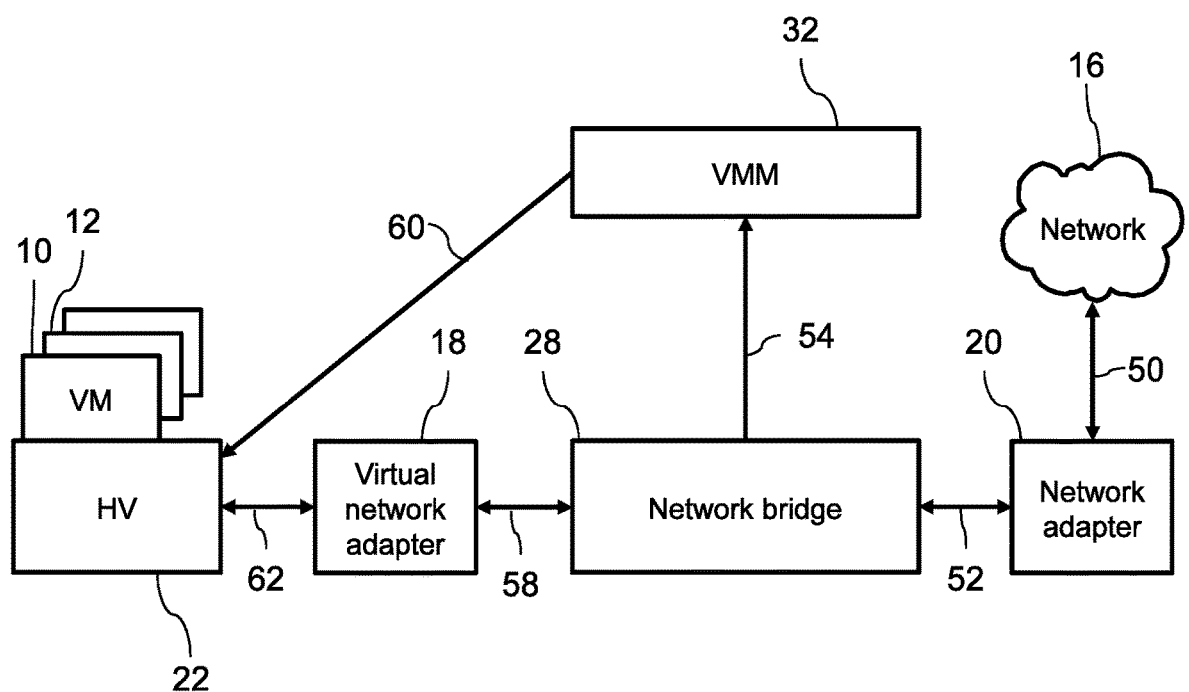
FIG. 1 depicts one embodiment of a system, and a data flow, for monitoring network traffic of virtual machines in a network, in accordance with one or more aspects of the present invention.

The present invention relates in general to data processing systems, and in particular, to a method, system and computer program product for suspending and resuming virtual machines in a network in dependence of network activity.

More particularly, a method is disclosed for suspending and resuming virtual machines in a network in dependence of network activity, which includes providing virtual machine manager, the virtual machine manager monitoring network traffic of the virtual machines on a network bridge in a network layer by using a data packet analysis to detect dedicated network protocol traffic.

The inventive method advantageously allows for suspending and resuming virtual machines depending on a user's network activity, by monitoring the VM's network traffic on a bridge device to ensure seamless operation. A virtual machine manager (VMM) is running e.g. on each node of a development and simulation cloud. This VMM may be extended to monitor the networking activity of each single VM.

Advantageously data packet monitoring may be established on the network bridge, which may be implemented as a virtual bridge. In a Linux implementation, e.g., there are virtual bridges available, behaving like physical bridges and being able to distribute data packets in a network. On this virtual network bridge filtering rules like, e.g. in a Linux implementation ebtables, may be used for extracting information from data packets. Filtering rules thus are additional features and may influence the distribution of data packets in the network.

Such a solution exhibits major advantages compared to known solutions, like establishing a pricing model that makes idle VMs unattractive for the user or enforcing a maximum VM run time. The inventive solution is feasible in organizations, e.g. for the development of firmware. There is no need to modify the operating system running inside the VM, e.g. by installing monitoring tools for keeping track of user activity. In contrast, the inventive solution does not require changes to the otherwise unmodified VM operating system under test.

Further, a computer program product is disclosed for suspending and resuming virtual machines in a network in dependence of network activity, providing a virtual machine manager, the computer program product including a computer readable storage medium having program instructions embodied therewith, the program instructions being executable by a computer to cause the computer to perform a method including, the virtual machine manager monitoring network traffic of the virtual machines on a network bridge in a network layer by using a data packet analysis to detect dedicated network protocol traffic.

Further, a data processing system for execution of a data processing program is disclosed, including computer readable program instructions for performing the method described above.

In the drawings, like elements are referred to with equal reference numerals. The drawings are merely schematic representations, not intended to portray specific parameters of the invention. Moreover, the drawings are intended to depict only typical embodiments of the invention and therefore should not be considered as limiting the scope of the invention.

The illustrative embodiments described herein provide a method, system, and computer program product for suspending and resuming virtual machines in a network in dependence of network activity. The illustrative embodiments are sometimes described herein using particular technologies only as an example for the clarity of the description. The illustrative embodiments may be used for suspending and resuming virtual machines, providing a virtual machine manager. The virtual machine manager is monitoring network traffic of the virtual machines on a network bridge in a network layer by using a data packet analysis to detect dedicated network protocol traffic.

FIG. 1 depicts a data flow for monitoring network traffic of virtual machines (VMs) 10, 12 in a network 16 according to an embodiment of the invention. A virtual machine manager (VMM) 32 is monitoring network traffic of the virtual machines 10, 12 on a network bridge 28 in a network layer by using a data packet analysis to detect dedicated network protocol traffic. The network bridge 28 is connected to the network 16 via a network adapter 20 (signals 52, 50), whereas the virtual machines 10, 12, running under control of a hypervisor (HV) 22, are connected via the hypervisor 22 (signal 62) and a corresponding virtual network adapter 18 (signal 58) to the network bridge 28. Information about the network traffic is monitored by the VMM 32 (signal 54). According to actions to be taken for the virtual machines 10, 12, the VMM 32 sends information (signal 60) to the hypervisor 22 concerning, for instance, starting a VM, stopping a VM, suspending a VM or resuming a VM.

Figure 2:
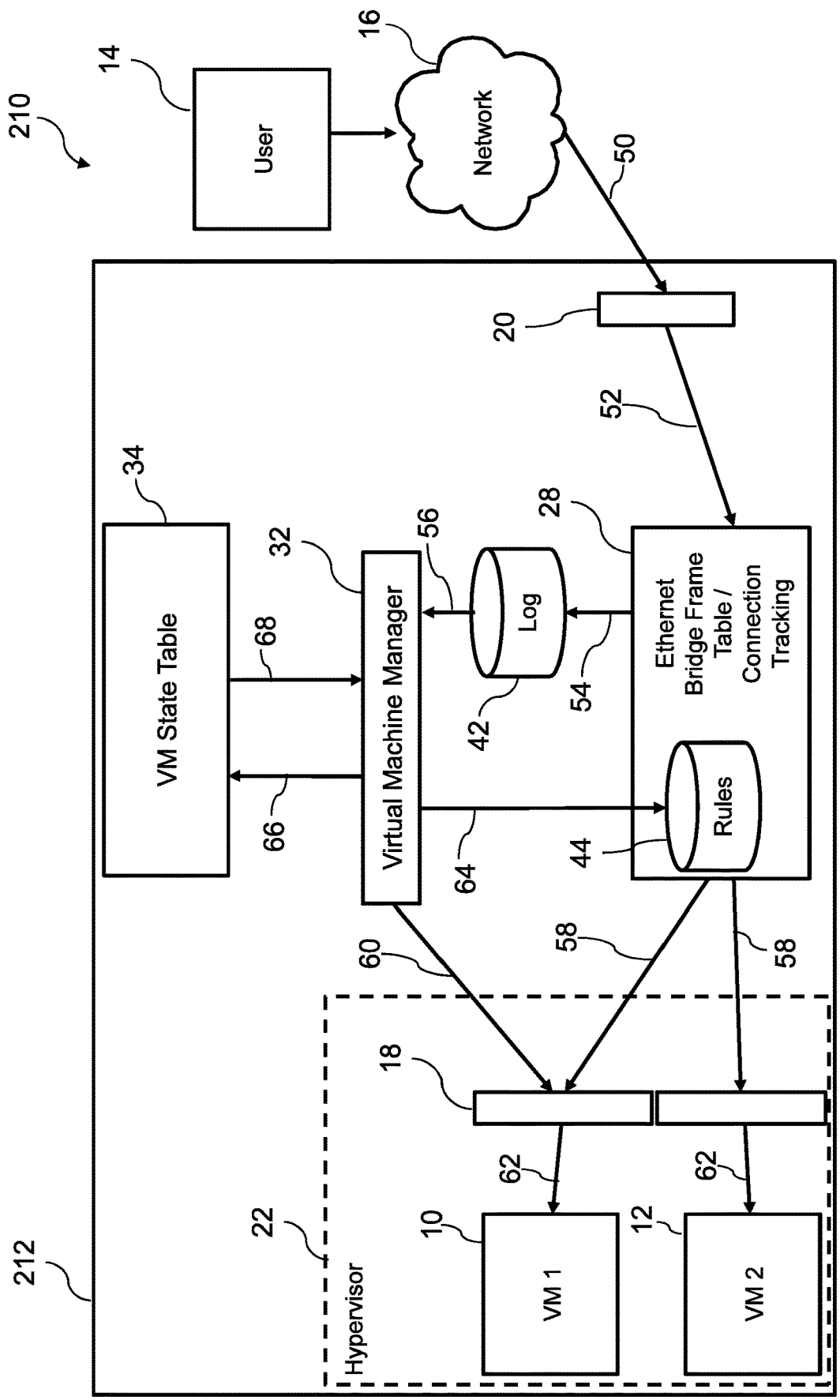
FIG. 2 depicts one embodiment of a data processing system implementing processing in accordance with one or more aspects of the present invention.

FIG. 2 shows a high level design of a data processing system 210, including a computer system 212 connected to a network 16 with input from a user 14 depicted. An inventive method for suspending and resuming the virtual machines 10, 12 in the network 16 in dependence of network activity may be implemented on data processing system 210.

Computer system 212 provides virtual machine manager 32. The virtual machine manager 32 may be monitoring network traffic of the virtual machines 10, 12 on the network bridge 28 in a network layer by using a data packet analysis to detect dedicated network protocol traffic.

Monitoring network traffic may be performed according to the data flow depicted in FIG. 1. For this purpose, an Ethernet packet filter, like a so called bridge frame table in a Linux implementation, such as ebtables, may be used for extracting information from data packets. Note that ebtables is an application program used to set up and maintain tables of rules inside a Linux kernel, and that inspect Ethernet frames. So the Ethernet bridge frame table may be implemented for extracting information from data packets on the network bridge 28.

Monitoring network traffic of the virtual machines 10, 12 may advantageously be performed by logging network addresses of the virtual machines 10, 12 in the network 16 (signals 50, 52), combining logged network addresses with information about suspending and/or resuming virtual machines 10, 12 based on filtering rules 44 being provided for such combination, and sending information about the network addresses of active and suspended virtual machines 10, 12 for virtual network adapters 18 assigned to the virtual machines 10,12 to the virtual machine manager 32 (signals 54, 56).

Advantageously, logging network addresses of the virtual machines 10, 12 in the network 16 may be performed by intercepting data packets sent between the network 16 and the virtual machines and extracting network addresses from it. Thus, it is possible to collect network addresses of data packets in the network 16, associated to MAC addresses.

The virtual machine manager 32 for this purpose is connected to a virtual machine state table 34. In one or more embodiments, a table with network addresses and states of running and suspended virtual machines 10, 12 may be used for receiving and sending information to the VMM 32. Network addresses are added to the table 34 for each new virtual machine 10, 12 or virtual network device.

The virtual machine manager 32 may send information about state changes of the one or more virtual machines 10, 12, for instance, when suspending or resuming, via signal 66 to the virtual machine state table 34. The virtual machine manager 32 may retrieve information about suspended virtual machines via signal 68. The virtual machines 10, 12, connected to the virtual network adapters 18 via signals 62, are controlled by the hypervisor 22.

A logging device 42 may be configured to log intercepted data packets, received from the network bridge 28, for forwarding to the virtual machine manager 32.

Filtering rules 44 for monitoring network traffic favorably may be configured as OSI Layer Two (OSI 2) filtering rules according to an implementation of an OSI data link layer. In a Linux implementation, ebtables may be used as a tool for implementing OSI Layer 2 filtering rules on the network bridge 28. Thus, on the hypervisor level, the Layer 2 network layer is available, corresponding to the implementation of a virtual bridge. In order to inspect a Layer 3 (IP) communication, ebtables may allow for deep packet inspection. For this purpose, ebtables may be set up to intercept incoming network protocol connect and disconnect commands. An example used may be SSH (VNC or others similar). A static relation of a MAC address to an IP address may be assumed for a sample embodiment.

Advantageously, due to the inventive method, the virtual machine manager 32, upon a disconnect operation of an existing network connection to the virtual machine 10, 12, may suspend the virtual machine 10, 12; and set up filtering rules 44 for intercepting connection attempts with a network address of the suspended virtual machine 10, 12. Further, upon a connection request to a suspended virtual machine 10, 12, the virtual machine manager 32 may delay a response to the connection request; resume the virtual machine 10, 12; and forward the delayed connection request to an operating system of the virtual machine 10, 12. For this purpose, the virtual machine manager 32 may resend the delayed connection request to the virtual network adapters 18 assigned to the virtual machines 10, 12 after resuming.

Advantageously, upon starting a virtual machine 10, 12, the virtual machine manager 32 may spawn a connection tracking task to monitor a network disconnect on the network bridge 28 for the network address of the virtual machine 10, 12.

Further, advantageously, upon suspending the virtual machine 10, 12, the virtual machine manager 32 may stop the connection tracking task to monitor a network disconnect on the network bridge 28 for the network address of the virtual machine 10, 12, and set up the filtering rules 44 for a network connection attempt for the network address of the virtual machine 10, 12.

Further, advantageously, upon stopping/crashing a virtual machine 10, 12, the virtual machine manager 32 may stop the connection tracking task to monitor a network disconnect on the network bridge 28 for the network address of the virtual machine 10, 12, as shown for the case of suspending a virtual machine 10, 12.

In an advantageous embodiment, for resuming the suspended virtual machine 10, 12, upon detecting a connection request to the network address of a suspended virtual machine 10, 12, e.g. by the Linux Ethernet bridge frame table ebtables, the network filtering rules on the network bridge 28, implemented (for instance) in ebtables, may dump the data packet of the received request to the logging device 42, wherein the logging device 42 is configured to log intercepted data packets received from the network bridge 28 for forwarding to the virtual machine manager 32. Such a logging device 42 may be the Linux user space logging daemon, ulogd. Further the virtual machine manager 32 listens for incoming data packets. The virtual machine manager 32 extracts the target network address and maps the network address to details of the virtual machine 10, 12, checking, if the network address is known for a virtual machine in state "suspended". Then, if a suspended virtual machine 10, 12 is found, the virtual machine manager 32 restarts the virtual machine 10, 12 and finally resends the data packet on hypervisor level to the virtual network adapter 18 of the virtual machine 10, 12.

Advantageously, network addresses, provided by a server in the network 16, may be dynamically assigned to the virtual network adapters 18 of the virtual machines 10, 12, wherein a reassignment of the assigned network addresses due to suspending a virtual machine 10, 12 may be prevented by periodically renewing the assigned network addresses via network communication from the respective virtual network adapter 18 to the server in order to prevent the reassignment. This may be achieved by, in response to suspending a virtual machine 10, 12, starting to periodically send renewals to the server for all its virtual network adapters 18 with dynamically assigned network addresses and further, in response to resuming the virtual machine 10, 12, stopping to send renewals to the server for all its virtual network adapters 18 with dynamically assigned network addresses.

Figure 3:
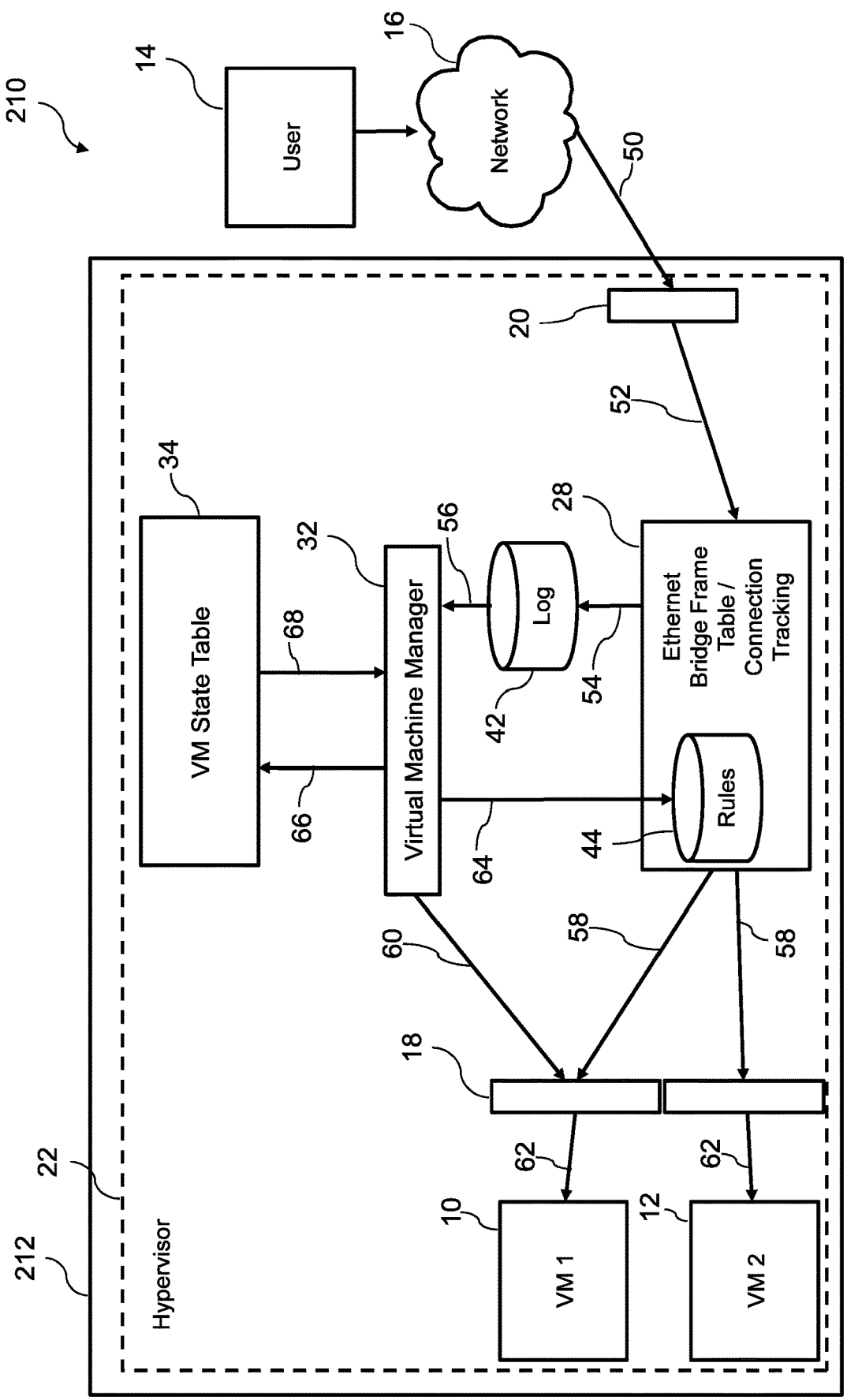
FIG. 3 depicts another embodiment of a data processing system implementing processing in accordance with one or more aspects of the present invention.

FIG. 3 shows a high level design of another embodiment of a data processing system, in accordance with one or more aspects of the present invention. In this embodiment, contrary to the embodiment of FIG. 2, where the hypervisor 22 includes the virtual machines 10, 12 and the virtual network adapters 18, the hypervisor 22 may advantageously include additionally the virtual machine manager 32, the network bridge 28 and the virtual machine state table 34, as well as the logging device 42 and the network adapters 20. The network adapters 20 in this embodiment would be virtualized as well, which exhibits a completely virtualized system of advantageous flexibility.

Figure 4:
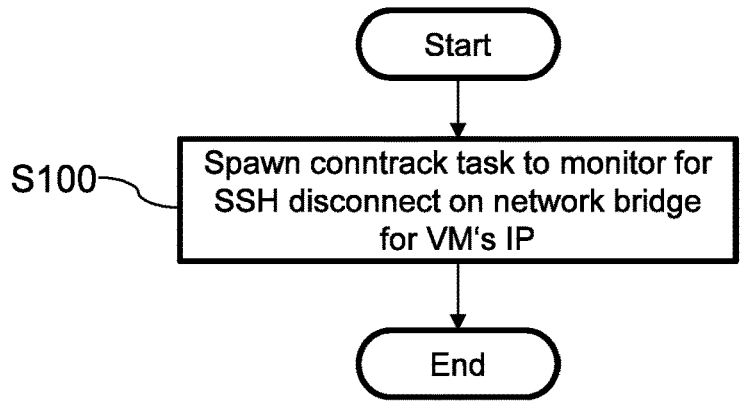
FIG. 4 depicts one embodiment of a process for starting virtual machines, in accordance with one or more aspects of the present invention.

In FIG. 4 a flowchart for starting virtual machines according to an embodiment of the invention is depicted. Advantageously, upon starting a virtual machine, the virtual machine manager may spawn a connection tracking task in step S100 to monitor a network disconnect on the network bridge for the network address of the virtual machine.

In a Linux implementation, one or more embodiments may include for this purpose a 'disconnect' rule, for example, for the SSH protocol. As a prerequisite, the network bridge may be configured to allow inspection of IP layer packets. On a Linux host, this may be enabled via the 'net.bridge.bridge-nf-call-arptables', 'net.bridge.bridge-nf-call-ip6tables', and 'net.bridge.bridge-nf-call-iptables' entries in the/proc file system after creating the network bridge device. First the 'conntrack' iptables module may be loaded. Then the virtual machine manager may monitor the 'conntrack' log for a network connection protocol disconnect event of the VM's IP address, e.g. for the SSH protocol. Advatnageously, this may be achieved upon the VM start, by issuing this command and filtering the output per running VM with the command:

'conntrack -E -e DESTROY -p tcp --dport 22-d<VM_IP>'

For an Ethernet (E) connection with a destination port 22 as an example. A result upon a disconnect operation might be:

'[DESTROY] tcp 6 src=1.2.3.4 dst=1.2.3.5 sport=37389 dport=22 src=1.2.3.5 dst=1.2.3.4' with source (src) and destination (dst) addresses shown as an example.

Figure 5:
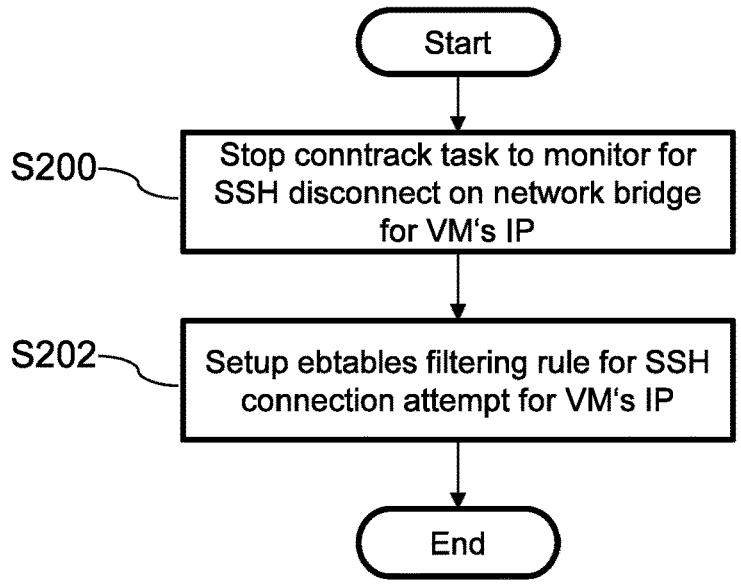
FIG. 5 depicts one embodiment of a process for suspending virtual machines, in accordance with one or more aspects of the present invention.

FIG. 5 shows a flowchart for suspending virtual machines according to one or more aspects of the present invention. Advantageously, upon suspending the virtual machine, the virtual machine manager, in step S200, may stop the connection tracking task to monitor a network disconnect on the network bridge for the network address of the virtual machine, and set up in step S202 the filtering rules for a network connection attempt for the network address of the virtual machine.

In FIG. 5, again, the Linux implementation is referred to with the 'conntrack' task for the network monitoring operation. In the Linux implementation, an advantageous embodiment may include a 'connect' rule, e.g. for the SSH protocol. Ethernet packets for SSH connection attempts on port 22 may be inspected by using the command:

'ebtables -A FORWARD --ip-destination <VM_IP>--ip-destination-port
22--ulog-nlgroup 5-j DROP', Using a user space logging daemon to log full packets in the user space (e.g. the so-called pcap format). As an example setup of such a user space logging daemon in a Linux operating system, the pcap output format can be activated by adding the line plugin="@pkglibdir@/ulogd_output_PCAP.so" to the ulogd.conf configuration file. Then, the ulogd may be started via the command 'ulogd-d'. The logged pcap files may, for example, be recorded in a file named 'ulog.pcap'.

Figure 6:
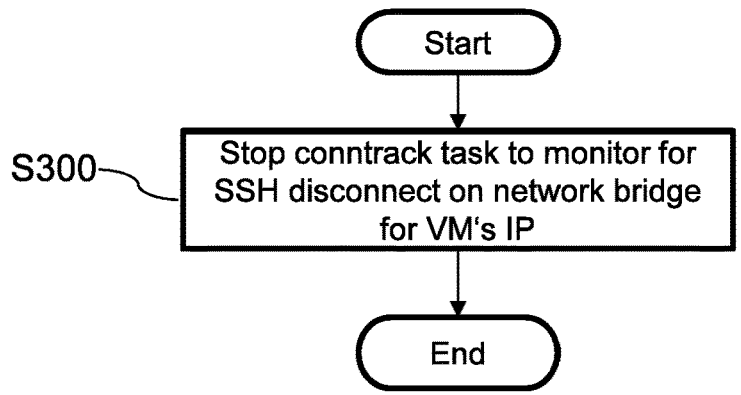
FIG. 6 depicts one embodiment of a process for stopping/crashing virtual machines, in accordance with one or more aspects of the present invention.

FIG. 6 shows a flowchart for stopping/crashing virtual machines according to one or more aspects of the present invention. Upon stopping/crashing a virtual machine, the virtual machine manager may stop in step S300 the connection tracking task to monitor a network disconnect on the network bridge for the network address of the virtual machine, as shown for the case of suspending a virtual machine.

Figure 7:
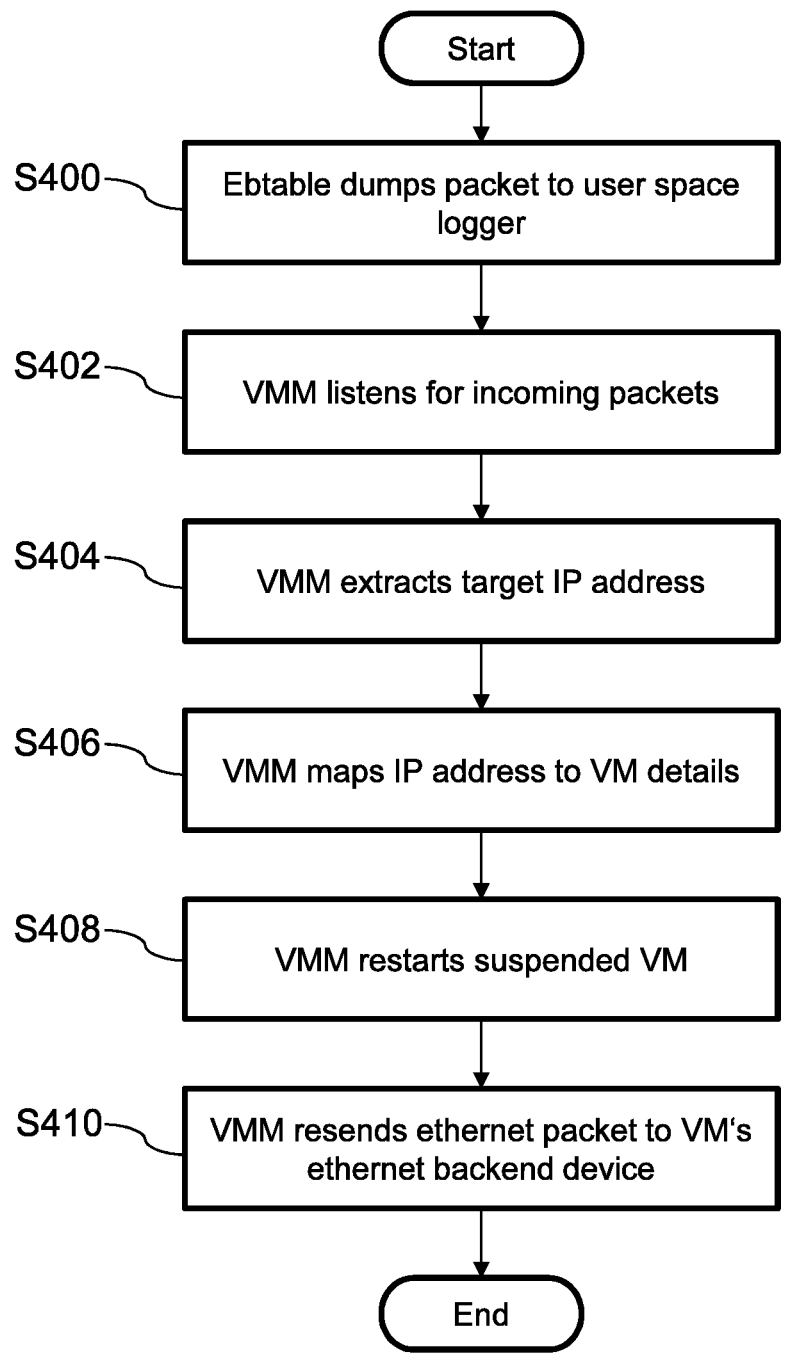
FIG. 7 depicts one embodiment of a process for resuming virtual machines, in accordance with one or more aspects of the present invention.

FIG. 7 shows a flowchart of one embodiment of a process for resuming virtual machines, according to one or more aspects of the present invention. In particular, a process is depicted for resuming the suspended virtual machine upon detecting a connection request to the network address of a suspended virtual machine, e.g. by the Linux implemented Ethernet bridge frame table ebtables. As shown, ebtables implemented for extracting information from data packets on the network bridge in step S400, may dump the data packet to the logging device, wherein the logging device is configured as a user space logger to log intercepted data packets received on the network bridge for forwarding to the virtual machine manager. Further the virtual machine manager listens for incoming data packets in step S402. In step S404, the virtual machine manager extracts the target network address from the incoming data packets and maps in step S406 the network address to details of the virtual machine, checking, if the network address is known for a virtual machine in the 'suspended' state. Then, if the suspended virtual machine corresponding to the network address is found, the virtual machine manager in step S408 restarts the suspended virtual machine and finally, in step S410, resends the data packet on hypervisor level to the virtual network adapter as a backend device of the virtual machine. Resending may be achieved, e.g., via the tool packetETH. An example command to be issued from the virtual machine manager thus may be:

-./packETHcli tap0-m 1-f ulog.pcap, where, for example, Tap0 is a virtual network adapter of the resumed virtual machine.

Figure 8:
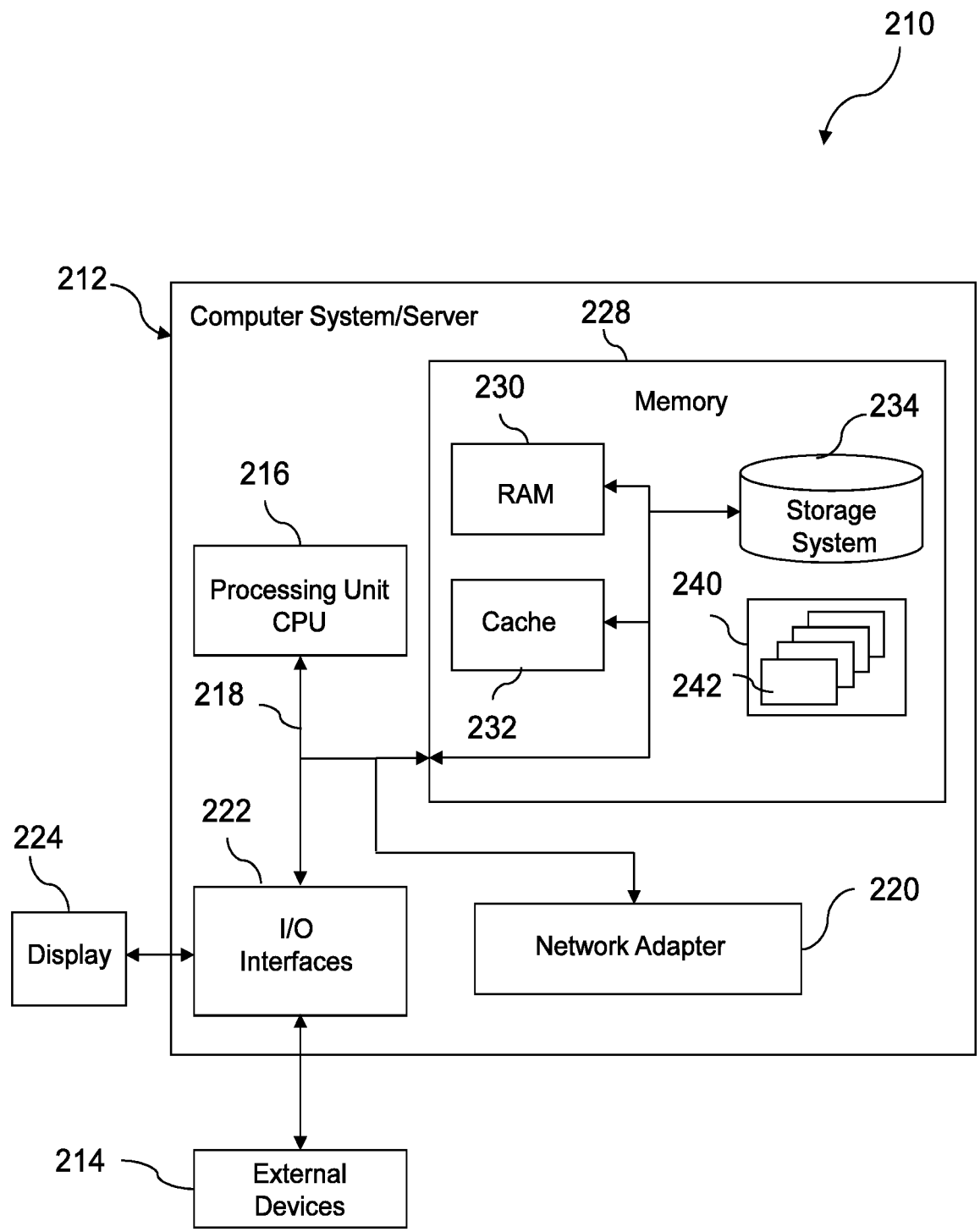
FIG. 8 is another example of a data processing system for executing processing, in accordance with one or more aspects of the present invention.

Referring now to FIG. 8, a schematic of an example of a data processing system 210 is shown. Data processing system 210 is only one example of a suitable data processing system and is not intended to suggest any limitation as to the scope of use or functionality of embodiments of the invention described herein. Regardless, data processing system 210 is capable of being implemented and/or performing any of the functionality set forth herein above.

In data processing system 210 there is a computer system/server 212, which is operational with numerous other general purpose or special purpose computing system environments or configurations. Examples of well-known computing systems, environments, and/or configurations that may be suitable for use with computer system/server 212 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 212 may be described in the general context of computer system executable instructions, such as program modules, being executed by a computer system. Generally, program modules may include routines, programs, objects, components, logic, data structures, and so on that perform particular tasks or implement particular abstract data types. Computer system/server 212 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 8, computer system/server 212 in data processing system 210 is shown in the form of a general-purpose computing device. The components of computer system/server 212 may include, but are not limited to, one or more processors or processing units 216, a system memory 228, and a bus 218 that couples various system components including system memory 228 to processor 216.

Bus 218 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 212 typically includes a variety of computer system readable media. Such media may be any available media that is accessible by computer system/server 212, and it includes both volatile and non-volatile media, removable and non-removable media.

System memory 228 can include computer system readable media in the form of volatile memory, such as random access memory (RAM) 230 and/or cache memory 232. Computer system/server 212 may further include other removable/non-removable, volatile/non-volatile computer system storage media. By way of example only, storage system 234 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 218 by one or more data media interfaces. As will be further depicted and described below, memory 228 may include at least one program product having a set (e.g., at least one) of program modules that are configured to carry out the functions of embodiments of the invention.

Program/utility 240, having a set (at least one) of program modules 242, may be stored in memory 228 by way of example, and not limitation, as well as an Operating System, one or more application programs, other program modules, and program data. Each of the Operating System, one or more application programs, other program modules, and program data or some combination thereof, may include an implementation of a networking environment. Program modules 242 generally carry out the functions and/or methodologies of embodiments of the invention as described herein.

Computer system/server 212 may also communicate with one or more external devices 214 such as a keyboard, a pointing device, a display 224, etc.; one or more devices that enable a user to interact with computer system/server 212; and/or any devices (e.g., network card, modem, etc.) that enable computer system/server 212 to communicate with one or more other computing devices. Such communication can occur via Input/Output (I/O) interfaces 222. Still yet, computer system/server 212 can communicate with one or more networks such as a local area network (LAN), a general wide area network (WAN), and/or a public network (e.g., the Internet) via network adapter 220. As depicted, network adapter 220 communicates with the other components of computer system/server 212 via bus 218. It should be understood that although not shown, other hardware and/or software components could be used in conjunction with computer system/server 212. Examples, include, but are not limited to: microcode, device drivers, redundant processing units, external disk drive arrays, RAID systems, tape drives, and data archival storage systems, etc.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, Firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:
  obtaining, by one or more processors of a network bridge, communicatively coupling a hypervisor running a group of virtual machines and an underlying network, from a virtual machine manager communicatively coupled to the hypervisor and the network bridge, identifications of dedicated network protocol traffic in network traffic of the group of virtual machines, to monitor activity or inactivity of each virtual machine in the group of virtual machines;
  logging, by the network bridge, the network addresses of the group of virtual machines in a resource of the underlying network, based on intercepting data packets originating from the underlying network and destined for the group of virtual machines;
  identifying, by the network bridge, in the logged addresses, active and inactive network addresses for the network traffic; and
  facilitating, by the network bridge, via the virtual machine manager, suspending of a first portion of the group of virtual machines, wherein the first portion of the group of virtual machines comprise active virtual machines with inactive network addresses.

2. The method according to claim 1, further comprising:
  facilitating, by the network bridge, via the virtual machine manager, resuming of a second portion of the group of virtual machines, wherein the second portion of the group of virtual machines comprise inactive virtual machines with active network addresses.

3. The method according to claim 2, wherein the facilitating, by the network bridge, via the virtual machine manager, resuming of the second portion of the group of virtual machines further comprises, for each virtual machine of the second portion:
  transmitting a connection request to the virtual machine;
  delaying a response to the connection request;
  resuming the virtual machine; and
  forwarding the delayed connection request to an operating system of the virtual machine.

4. The method according to claim 2, wherein the facilitating, by the network bridge, via the virtual machine manager, resuming of the second portion of the group of virtual machines, comprises, for at least one virtual machine of the second portion:
  upon the at least one virtual machine, spawning a connection tracking task to monitor a network disconnect of a specific network protocol on the network bridge for the network address of the at least one virtual machine.

5. The method according to claim 4, wherein the facilitating, by the network bridge, via the virtual machine manager, suspending of the first portion of the group of virtual machines, comprises, for at least on virtual machine of the first portion:
  stopping the connection tracking task to monitor a network disconnect on the network bridge for the network address of the at least one virtual machine; and
  setting up filtering rules for a network connection attempt for the network address of the at least one virtual machine.

6. The method according to claim 5, further comprising:
  stopping the connection tracking task to monitor a network disconnect on the network bridge for the network address of the virtual machine.

7. The method according to claim 2, wherein network addresses, provided by a server in the network, are dynamically assigned to the virtual network adapters of the virtual machines, and a reassignment of the assigned network addresses due to suspending a virtual machine is prevented by periodically renewing the assigned network addresses via network communication from the respective virtual network adapter to the server in order to prevent the reassignment, the periodically renewing comprising:
  based on suspending a virtual machine, starting to periodically send renewals to the server for all its virtual network adapters with dynamically assigned network addresses; and
  based on resuming the virtual machine, stopping to send renewals to the server for all its virtual network adapters with dynamically assigned network addresses.

8. The method according to claim 1, wherein an Ethernet packet filter is used on the network bridge for extracting information from the intercepted data packets.

9. The method according to claim 1, wherein the virtual machine manager is connected to a virtual machine state table, and the virtual machine manager sends information about suspending or resuming one or more virtual machines to the virtual machine state table, and wherein the virtual machine manager retrieves information about suspended virtual machines from the virtual machine state table.

10. The method according to claim 1, wherein identifying the active and the inactive network addresses comprises filtering, by the network bridge, the logged addresses.

11. The method according to claim 10, wherein the filtering is based on pre-determined rules.

12. The method according to claim 11, wherein the virtual machine manager pushes the pre-determined rules to virtual network adapters assigned to each virtual machine of the group of virtual machines.

13. The method according to claim 11, wherein the pre-determined rules comprise Open Systems Interconnection Layer Two filtering rules.

14. The method according to claim 1, wherein the logging further comprises forwarding the intercepted data packets to the virtual machine manager.

15. The method according to claim 1, wherein the facilitating, via the virtual machine manager, suspending of the first portion of the group of virtual machines further comprises, for each virtual machine of the first portion:
  disconnecting an operation of an existing network connection to the virtual machine;
  suspending the virtual machine; and setting up filtering rules for intercepting connection attempts with a network address of the suspended virtual machine.

16. The method according to claim 1, wherein the data packet analysis comprises inspecting an Open Systems Interconnection Layer Three communication.

17. The method according to claim 1, wherein the hypervisor comprises an item selected from the group consisting of: the virtual machine manager, the network bridge, and a virtual machine state table.

18. A computer program product comprising a computer readable storage medium readable by one or more processors and storing instructions for execution by the one or more processors for performing a method comprising:

obtaining, by the one or more processors of a network bridge, communicatively coupling a hypervisor running a group of virtual machines and an underlying network, from a virtual machine manager communicatively coupled to the hypervisor and the network bridge, identifications of dedicated network protocol traffic in network traffic of the group of virtual machines, to monitor activity or inactivity of each virtual machine in the group of virtual machines;

logging, by the network bridge, the network addresses of the group of virtual machines in a resource of the underlying network, based on intercepting data packets originating from the underlying network and destined for the group of virtual machines;

identifying, by the network bridge, in the logged addresses, active and inactive network addresses for the network traffic; and facilitating, by the network bridge, via the virtual machine manager, suspending of a first portion of the group of virtual machines, wherein the first portion of the group of virtual machines comprise active virtual machines with inactive network addresses.

19. The computer program product of claim 18, the method further comprising:

facilitating, by the network bridge, via the virtual machine manager, resuming of a second portion of the group of virtual machines, wherein the second portion of the group of virtual machines comprise inactive virtual machines with active network addresses.

20. A system comprising:

a memory; and one or more processors communicatively coupled to the memory, wherein the system performs a method comprising:

obtaining, by the one or more processors of a network bridge, communicatively coupling a hypervisor running a group of virtual machines and an underlying network, from a virtual machine manager communicatively coupled to the hypervisor and the network bridge, identifications of dedicated network protocol traffic in network traffic of the group of virtual machines, to monitor activity or inactivity of each virtual machine in the group of virtual machines;

logging, by the network bridge, the network addresses of the group of virtual machines in a resource of the underlying network, based on intercepting data packets originating from the underlying network and destined for the group of virtual machines;

identifying, by the network bridge, in the logged addresses, active and inactive network addresses for the network traffic; and facilitating, by the network bridge, via the virtual machine manager, suspending of a first portion of the group of virtual machines, wherein the first portion of the group of virtual machines comprise active virtual machines with inactive network addresses.

\* \* \* \* \*